US006684940B1

(12) United States Patent
Chao et al.

(10) Patent No.: US 6,684,940 B1
(45) Date of Patent: Feb. 3, 2004

(54) HEAT PIPE SYSTEMS USING NEW WORKING FLUIDS

(75) Inventors: David F. Chao, North Olmsted, OH (US); Nengli Zhang, North Ridgeville, OH (US)

(73) Assignee: The United States of America as represented by the Administrator of the National Aeronautics and Space Administration, Washington, DC (US)

( * ) Notice: Subject to any disclaimer, the term of this patent is extended or adjusted under 35 U.S.C. 154(b) by 0 days.

(21) Appl. No.: 10/161,994

(22) Filed: May 29, 2002

(51) Int. Cl.$^7$ ............................................... F28D 15/00
(52) U.S. Cl. .................. 165/104.21; 165/185; 361/700; 257/715
(58) Field of Search ....................... 165/104.33, 104.21; 361/700; 257/715

(56) References Cited

U.S. PATENT DOCUMENTS

| | | | | |
|---|---|---|---|---|
| 3,620,298 | A | * | 11/1971 | Somerville et al. ......... 285/244 |
| 3,661,202 | A | * | 5/1972 | Moore, Jr. .............. 165/104.26 |
| 3,777,811 | A | | 12/1973 | Shcosinger ................. 165/105 |
| 3,801,446 | A | | 4/1974 | Sparber et al. ................ 176/39 |
| 3,873,459 | A | | 3/1975 | Pawlak et al. .............. 252/51.5 |
| 3,957,024 | A | * | 5/1976 | Mills .......................... 123/122 |
| 4,125,122 | A | | 11/1978 | Stachurski .................. 136/205 |
| 4,177,155 | A | | 12/1979 | Popplewell ................. 252/49.3 |
| 4,220,195 | A | | 9/1980 | Borgoyn et al. ................ 165/1 |
| 4,463,798 | A | * | 8/1984 | Pogson et al. ................ 165/46 |
| 4,664,181 | A | | 5/1987 | Sumberg ................ 165/104.13 |
| 4,724,679 | A | * | 2/1988 | Radermacher ............... 62/101 |
| 4,883,116 | A | * | 11/1989 | Seidenberg et al. ..... 165/104.26 |
| 5,647,429 | A | * | 7/1997 | Oktay et al. ........... 165/104.26 |
| 5,827,444 | A | * | 10/1998 | Shimizu et al. .......... 232/62.52 |
| 5,829,259 | A | | 11/1998 | Chandler et al. .............. 62/112 |
| 5,947,193 | A | | 9/1999 | Adkins et al. .......... 165/104.26 |
| 6,227,288 | B1 | | 5/2001 | Gluck et al. ........... 165/104.26 |
| 6,247,525 | B1 | | 6/2001 | Smith et al. ........... 165/104.25 |
| 2002/0025279 | A1 | | 2/2002 | Weigl et al. ................. 422/100 |
| 2002/0144804 | A1 | * | 10/2002 | Liang et al. ........... 165/104.33 |

OTHER PUBLICATIONS

"Study of the Heat of Reversible Adsorption at The Air–Solution Interface" by Vochten et al, Journal of Colloid and Interface Science, vol. 42, No. 2, Feb., 1973, pp. 320–327.
"Mechanisms of Convection Instability in Thin Liquid Layers Induced by Evaporation" by Zhang et al, Int. Comm. Heat Mass Transfer, vol. 26, No. 8, pp. 1069–1080, 1999.
"Pool boiling of a non–azeotropic binary mixture under microgravity" by Abe et al, Int. Journal of Heat & Mass Transfer, vol. 37, No. 16, pp. 2405–2413, 1994.
"Effects of gravity on the boiling of binary fluid mixtures" by Ahmed et al, Intl. Journal of Heat & Mass Transfer, vol. 41, No. 16, pp. 2469–2483, 1998.
"On the Role of Marangoni Effects on the Critical Heat Flux for Pool Boiling of Binary Mixtures" by McGillis et al, Journal of Heat Transfer, vol. 118, pp. 103–109, 1996.

* cited by examiner

*Primary Examiner*—Terrell McKinnon
(74) *Attorney, Agent, or Firm*—Kent N. Stone

(57) ABSTRACT

The performance of a heat pipe system is greatly improved by the use of a dilute aqueous solution of about 0.0005 and about 0.005 moles per liter of a long chain alcohol as the working fluid. The surface tension-temperature gradient of the long-chain alcohol solutions turns positive as the temperature exceeds a certain value, for example about 40° C. for n-heptanol solutions. Consequently, the Marangoni effect does not impede, but rather aids in bubble departure from the heating surface. Thus, the bubble size at departure is substantially reduced at higher frequencies and, therefore, increases the boiling limit of heat pipes. This feature is useful in microgravity conditions. In addition to microgravity applications, the heat pipe system may be used for commercial, residential and vehicular air conditioning systems, micro heat pipes for electronic devices, refrigeration and heat exchangers, and chemistry and cryogenics.

17 Claims, 2 Drawing Sheets

HEAT PIPE SYSTEMS USING NEW WORKING FLUIDS

ORIGIN OF THE INVENTION

The invention described herein was made by a civil servant employee of the United States Government, and a non-civil servant employee working under a NASA contract, and is subject to the provisions of Section 305 of the National Aeronautics and Space Act of 1958, Public Law 85-568 (72 Stat. 435; 42 U.S.C. 2457).

BACKGROUND OF THE INVENTION

1. Field of the Invention present invention relates to the field of heat transfer. More particularly, it relates to the use of new heat transfer fluids in a heat transfer system, particularly for heat pipe systems both in terrestrial and microgravity environments.

2. Description of the Relevant Art

Heat pipes can be described as devices employing closed evaporating-condensing cycles for transporting heat from a locale of heat generation to a location of heat rejection, using a capillary structure or wick for return of the condensate. These devices often have the shape of a pipe or tube that is closed on both ends. For the purpose of the present invention, the term "heat pipe" is used in a more general sense to refer to devices of any type of geometry that are designed to function as described.

The heat pipe is a highly efficient heat transfer system and has been broadly used in spacecraft, energy recuperation, power generation, chemical engineering, electronics cooling, air conditioning, engine cooling and other applications. Recently, thermal management has become one of the most critical technologies in electronic product development and directly influences cost reliability, and performance of the finished products. Heat pipes are excellent heat transfer devices, but a serious constraint on conventional heat pipes is the reduction of transport capabilities in which the condenser is located below the evaporator section in a gravitational field, or when the heat pipes are used at low-gravity conditions.

All of the heat pipes, including conventional heat pipes, capillary pumped loops (CPLs), loop heat pipes (LHPs), and micro heat pipes, have a common concern, namely the heat transfer limits. These limits determine the maximum heat transfer rate that a particular heat pipe can achieve under certain working conditions. Among them the capillary limit and the boiling limit are the restrictive factors at normal operating temperatures. Both of them are caused by the characteristics of the surface tension.

The boiling limitation is closely related to the bubble formation and detachment from the wall and/or wick at the evaporator section of heat pipes. It is well known that surface tension effects, including temperature-driven surface tension gradients, are dominant when the buoyancy force is diminished in microgravity conditions. Most previous studies have shown that, rather than assisting in the detachment process, surface tension unfortunately tends to keep the bubbles on the wall and in that way to impede bubble detachment. The surface tension gradient driven by temperature has been also considered as a force holding the bubbles attached to the wall surface. This, of course, is quite detrimental to boiling heat transfer in nucleate boiling regime.

Recently, many efforts have been made to try to enhance boiling heat transfer through Marangoni effects in fluid mixtures at normal gravity, as well as in microgravity. Marangoni effect represents the flow resulting from gradients in surface tension giving rise to the transfer of heat and mass. It is particularly relevant to microgravity conditions wherein gravity-induced convection is absent. It is found that a small amount of a surface-active additive considerably increases the nucleate boiling heat transfer coefficient of water at normal gravity. However, the effect under microgravity conditions is not known. A serious problem with using a surfactant is its foaming in the vapor. McGillis and Carey reported in their article "On the Role of Marangoni Effects on the Critical Heat Flux for Pool Boiling of Binary Mixtures", *Journal of Heat Transfer*, Vol.118, No. 1, 1996, pp. 103–118, that small additions of alcohol to water increased the critical heat flux (CHF) above that of the pure water, and higher concentrations of the alcohol began decreasing the CHF to near that of the pure alcohol. On the other hand, for water ethylene glycol mixtures, addition of the glycol decreased the CHF relative to that of pure water.

Abe et al tested water-ethanol mixtures of 11.3 and 27.3 wt % of ethanol and reported in the article "Pool Boiling of a Non-Azeotropic Binary Mixture under Microgravity", *International Journal of Heat and Mass Transfer*, Vol. 37, No. 16, 1994, pp. 2405–2413 that heat transfer is enhanced by reductions in gravity over the major portion of the nucleate boiling regime, but the CHF decreases 20–40% from the terrestrial level. The boiling heat transfer performance of the mixtures at normal gravity is much worse than that of pure water and, although enhanced under microgravity, it still cannot reach the level of pure water at normal gravity. Therefore, the water-ethanol mixtures are unacceptable for space applications.

Ahmed and Carey in their article entitled "Effects of Gravity on the Boiling of Binary Fluid Mixtures" appearing in *International Journal of Heat and Mass Transfer*, Vol. 41, No.,16, 1998, pp. 2469–2483, conducted an experiment with water-2-propanol mixtures under reduced gravity. They concluded that the Marangoni effect arising from the surface tension gradients due to concentration gradients is an active mechanism in the boiling of binary mixtures, and that the boiling mechanism in these mixtures is nearly independent of gravity.

The experimental results obtained by Abe et al and by Ahmed and Carey clearly show that for so-called positive mixtures, in which the more volatile component has a lower value of surface tension, the Marangoni mechanism is strong enough in the mixtures to sustain stable nucleate boiling under microgravity conditions.

Besides the surface tension gradients due to concentration gradients, Marangoni effects are also induced by temperature gradients, which are more common and more important in heat transfer devices. Unfortunately, all working fluids used in existing heat transfer devices, including heat pipes, have a negative gradient of surface tension against temperature which is quite detrimental to boiling heat transfer, as mentioned above. In addition to the Marangoni flow around bubbles induced by the negative surface-tension-temperature gradient that presses the bubbles onto the heating surface resulting in an unfavorable situation for boiling performance, another Marangoni effect induced by the surface-tension-temperature gradient is the moving of a liquid body towards the region of lower temperature, thus preventing liquid spreading on a heated portion of the heating surface, such as the evaporator section of heat pipes.

All heat pipes have a boiling limit, which is directly related to bubble formation in the liquid. If the number and size of vapor bubbles generated at the wall and/or the fin-wick interface are small, these bubbles may migrate from the solid surfaces to the liquid-vapor interface and vent into the vapor groove without destroying the capillary menisci. However, as the heat flux is increased further, bubbles may coalesce, form a vapor blanket at the wall and/or the fin-wick interface, and eliminate the capillary force that circulates the liquid condensate. Vapor bubbles that are coalesced at the evaporator section may block the liquid return from the condenser section and the boiling limit can be reached. For the heat pipes with a wick structure, the critical temperature difference across the liquid layer at the evaporator section, which reflects the boiling limit, is given as:

$$\Delta T_{crit} = T_w - T_v = \frac{2\sigma T_w}{h_{fg}\rho_v}\left(\frac{1}{R_b} - \frac{1}{r_{ef}}\right)$$

where $T_w$ and $T_v$ are the wall temperature and the vapor temperature at the evaporator section, respectively; $\sigma$ is the surface tension of the working fluid; $h_{fg}$ is the enthalpy of vaporization of the working fluid; $\rho_v$ is the vapor density; $R_b$ is the radius of vapor bubble at the liquid-wall interface, and $r_{ef}$ is the effective pore radius of the wick or the effective curvature radius of the liquid film on the wall. It is obvious that the critical temperature difference closely relates to the characteristics of the surface tension of the working fluid. Based on this relation, ignoring the changes of $R_b$ and $r_{ef}$ with the wall temperature, the following equation can be derived:

$$\frac{\partial(\Delta T_{crit})}{\partial T_w} = \frac{2T_w}{h_{fg}\rho_v}\left(\frac{1}{R_b} - \frac{1}{r_{ef}}\right)\frac{\partial \sigma}{\partial T_w} + \frac{2\sigma}{h_{fg}\rho_v}\left(\frac{1}{R_b} - \frac{1}{r_{ef}}\right)$$

It can be seen that the negative surface-tension gradient with temperature will reduce the critical temperature difference when the operating temperature at the evaporator section is increased.

On the other hand, the available capillary-pressure pumping-head decreases as the evaporating temperature of the heat pipes increases, and the operation becomes unstable. The varying of the available capillary-pressure pumping-head $P_c$ with temperature can be expressed as:

$$\frac{\partial \Delta p_c}{\partial T_w} = \frac{2}{r_{ef}}\cos\theta\frac{\partial \sigma}{\partial T_w} - \frac{\partial \sigma}{r_{ef}}\sin\theta\frac{\partial \theta}{\partial T_w}$$

where $\theta$ is the contact angle of the working fluid on the wall or the wick surface. It is obvious that because of a negative value of $$\frac{\partial \sigma}{\partial T_w}$$

and a positive value of $$\frac{\partial \theta}{\partial T_w},$$

the left side of the equation, $$\frac{\partial \Delta p_c}{\partial T_w},$$

is negative, meaning a decrease of the available capillary-pressure pumping-head when the temperature at the evaporation section is increased.

The increase of the operative temperature also leads to the increase of liquid pressure drop. As a result, the heat load of the heat pipe system is limited. Additionally, it has been demonstrated that capillary-pumped device instabilities are caused by thermocapillary instabilities of the contact line region of evaporating menisci. The cause of the instabilities is disintegration of the liquid film, caused by the relation of negative surface tension gradient with temperature.

Water has widely been used in heat pipes for all kinds of systems, both in terrestrial and microgravity environments, by virtue of its availability, cost, safety, and especially its high surface tension. Surface tension ($\sigma$) of water can be formulated as:

$$\sigma = 75.64 - 0.1673t$$

where t is the temperature in degrees Celsius. As can be seen from this equation, the surface tension of water largely decreases as temperature increases, and, therefore, the heat load and the performance of the heat pipe systems with water are limited. As contrasted to the existing working fluids used in the heat pipes, the new working fluids introduced by the present invention have positive gradient of surface tension with temperature. All the shortcomings induced by the negative surface-tension-temperature gradient are eliminated. The heat load of heat pipes will be significantly increased for the results of increase of both boiling and capillary limits and the operation of heat pipes will be more stable.

A number of other water mixtures have also been used as working fluids, as in, for example, U.S. Pat. No. 3,777,81 1. This patent specifies that desirable working fluids for heat pipe devices include properties such as high surface tension and a freezing point above the lowest temperatures that may be encountered. It states that lower freezing point fluids such as "the alcohols . . ." are less effective and less desirable than liquid metals and water for use in heat pipe-type devices to heat transport in space. U.S. Pat. No. 4,664,181 relates to heat pipe working fluids containing water and between about 1% and 7.5% by volume of low molecular weight alcohols, such as ethanol, propanol and butanol. The mixture serves to protect the heat pipe from damage due to freezing. The patent does not deal with enhancements of heat transfer of these working fluids through changing surface tension characteristics for increase of heat pipes' heat load and stabilities, especially under microgravity conditions. In fact, as solutions, the properties of the dilute aqueous solutions of long-chain alcohols are quite different from the one of the water-alcohol mixtures, especially the surface tension characteristics with temperature.

BRIEF DESCRIPTION OF THE INVENTION

One object of the present invention is to greatly increase the heat transfer performance of heat pipes, including conventional heat pipes, micro heat pipes, capillary pumped loops (CPLs) and loop heat pipes (LHPs), for such uses as electronics cooling, air conditioning, engine cooling, power generation and energy recuperation, by using the new working fluids that have a positive surface tension gradient with temperature. The operational instabilities are also eliminated.

A second objective is to use dilute aqueous solutions of long-chain alcohols as working fluids of heat pipes for space applications within the operating regimes of these working fluids.

Yet another object is to extend the limit of the pumping capability of the capillary structure in providing enough liquid return to the evaporator, including an increase in the maximum heat flow rate at operating temperature.

Still another object is to obtain higher pumping capability over long distances at any orientation in a gravitational or microgravitational field.

Finally, it is an object to provide a means to reduce costs and increase the reliability and performance of finished products that utilize heat pipes for thermal management.

These and other objects and advantages, that will become apparent upon a reading of the detailed description described below, are achieved in the following manner.

A heat pipe system is described which utilizes a working fluid that has a positive gradient of surface tension with temperature. The working fluid comprises a dilute aqueous solution of a straight or a branched chain alcohol containing 4 or more carbon atoms. The candidate alcohols are, n-butanol, n-pentanol, n-hexanol, n-heptanol, n-octanol, n-nonanol, n-decaol, 2 or 3 or 4 or 5 nonanol, or 2,6-Dimethyl-4-heptanol. or 3,5-Dimethyl-4-heptanol, or 2,2-Diethyl-1-pentanol, and 7-Methyl-1-octanol. The alcohols are present below their saturated concentration, generally in a very small amount, preferably between about 0.0005 moles per liter and about 0.005 moles per liter of water.

The invention also relates to a heat pipe system comprising a closed evaporating-condensing cycle and the method of its use. The system includes a working fluid having a positive gradient of surface tension with temperature. The working fluid comprises an aqueous solution of a straight or a branched chain alcohol containing more than 4 carbon atoms.

The invention also relates to the method of achieving heat exchange under conditions of microgravity comprising the use of a working fluid in a heat exchanger wherein the fluid comprises an aqueous solution and an effective amount of a long-chain alcohol to provide the fluid with a positive gradient of surface tension with temperature. The fluid comprises an aqueous solution of an alcohol containing at least 4 carbon atoms. The alcohol is selected from the group consisting of $C_4$ to $C_{10}$ straight and branched chain alcohols, and is used in a concentration below its saturated concentration, which is between about 0.0005 and about 0.005 moles per liter of water. The heat exchanger typically comprises a heat pipe selected from a conventional heat pipe, a capillary pumped loop (CPL), a loop heat pipe (LHP) and a micro heat pipe.

Still further, the present invention relates to a method of increasing the heat transfer rate of an aqueous working fluid in a heat pipe. The method involves adding to the working fluid of water an effective amount of an alcohol to provide the fluid with a positive gradient of surface tension with temperature in the range of operating temperatures of the fluid. Typically, the alcohol is a $C_4$ to $C_{10}$ straight or branched chain and is present in the fluid in an amount of between about 0.0005 and about 0.005 moles per liter.

DETAILED DESCRIPTION OF THE INVENTION

Capillary pressure is the driving force for the circulation of the working fluid in heat pipe systems, and is considered as an operating limit with respect to total pressure drop within the system. For a wick-structured heat pipe system including conventional heat pipes, CPLs and LHPs, stable working fluid circulation is achieved through the capillary pressure head developed by the wick structure. The available capillary pressure pumping head is a function of the surface tension of the working fluid. Thus, the surface tension is a key factor in determining the capillary limit of the heat pipe system.

Figure 1:
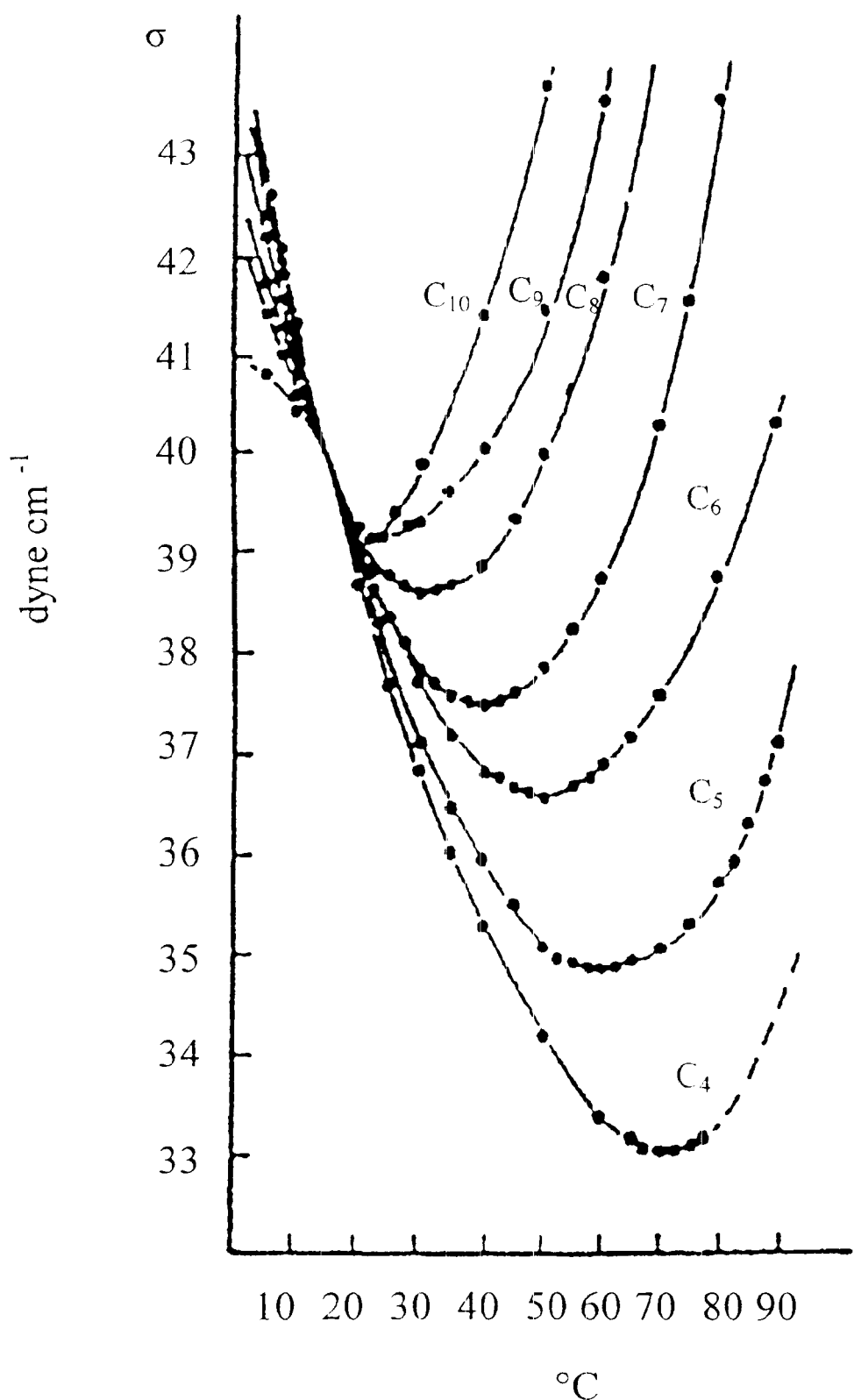
FIG. 1 is a graph showing the surface tension versus temperature for a series of dilute aqueous solutions of n-alcohols.

One of the performance indexes of a heat pipe is its maximum heat load value. To ensure a large heat load without reaching the boiling limit at the evaporator, the most significant factor is the ability of the working fluid to wet the heated wall. In accordance with the teachings of the present invention, dilute aqueous solutions of alcohols with a chain length of at least four carbon atoms develop a positive surface-tension-temperature gradient when the fluid temperature exceeds a certain value, for example about 40° C. for the aqueous solutions of n-heptanol. This is shown in FIG. 1 which plots the surface tension vs. temperature for seven aqueous solutions from $C_4$ to $C_{10}$. It is noted that, as the chain length of the alcohol increases, the temperature inversion point of the surface tension gradient (i.e. the temperature at which the surface tension gradient changes from a negative value to a positive one with temperature) decreases. All of this data is determined at Earth's gravity.

Figure 2:
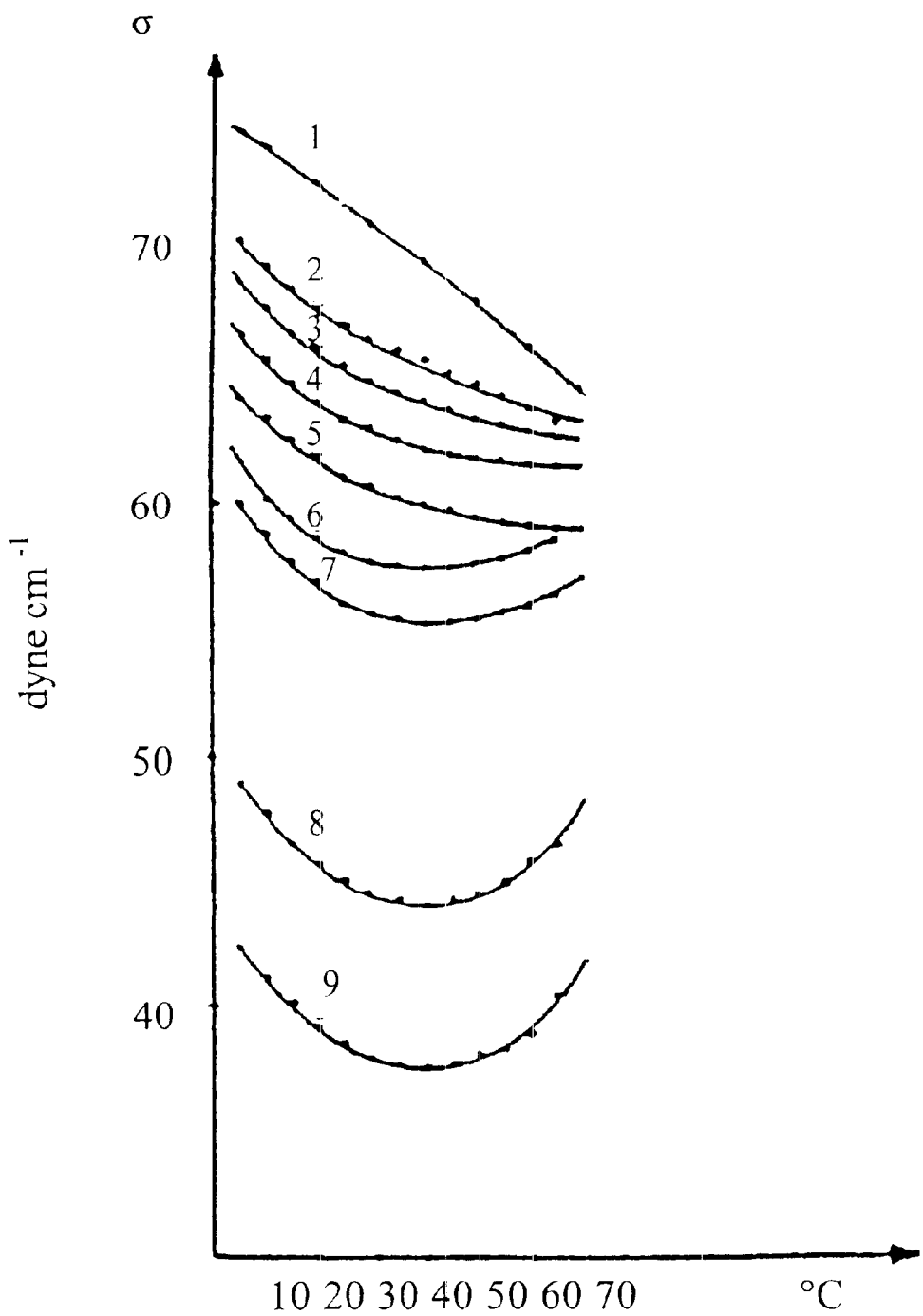
FIG. 2 is a graph showing the surface tension of different concentrations of n-heptanol in water at various temperatures.

Turning now to FIG. 2, the effect of concentration of n-heptanol in the aqueous solution on the surface tension with various temperatures is shown. These results are reported in an article by R. Vochten et al entitled "Study of the Heat of Reversible Adsorption at the Air-Solution Interface" in the *Journal of Colloid and Interface Science*, Vol. 42, No. 2 (1973), pp. 320–327. Pure water and eight different dilute aqueous concentrations of n-heptanol were tested with the surface tension measured at various temperatures between 0° C. and 70° C. and at 760 mm Hg. These concentrations are noted as follows:

| Sample No. | Concentration |
| --- | --- |
| 1 | Pure water |
| 2 | $6.31 \times 10^{-4}$ |
| 3 | $8.00 \times 10^{-4}$ |
| 4 | $1.00 \times 10^{-3}$ |
| 5 | $1.30 \times 10^{-3}$ |
| 6 | $1.59 \times 10^{-3}$ |
| 7 | $2.00 \times 10^{-3}$ |
| 8 | $5.00 \times 10^{-3}$ |
| 9 | $7.60 \times 10^{-3}$ |

The surface tension of pure water is 75.64 dynes at 0° C. and 58.91 dynes at 100° C. (see Vargaftik et al, entitled "International Tables of the Surface Tension of Water" in *J. Phys. Chem. Ref. Data*, Vol. 12, 1983, p. 817). It is readily apparent from FIG. 2 that the surface tension gradient of dilute aqueous solutions of n-heptanol alcohol shows a positive value near the boiling point while having almost same value of surface tension as water. It is noted that solutions having concentrations of 0.005 mole per liter and higher have a substantially larger surface tension gradient near the boiling point than those solutions of 0.002 mole per liter and less. Furthermore, the effect of temperature on surface tension on samples 8 and 9 is more than the effect on samples 1–7.

This surface tension force is assisted by the buoyant force in nucleate boiling on earth, whereas it would become the principal driving force for bubble departure from the heating surface in microgravity environments. Consequently, bubble departure size is smaller in these aqueous solutions than in water, with a higher departure frequency.

Note that it requires the addition of only a small quantity of the long-chain alcohols, on the order of $10^{-3}$ mole/l, to alter surface tension characteristics of water without affecting other bulk properties of the water, such as the boiling point. Another important feature of these aqueous solutions is a very high value of the positive surface tension-temperature gradient when the working fluid temperature is near its saturation point, thus inducing considerable driving force for bubble departure and moving of the fluid towards the hot areas in the evaporator section of heat pipes. Recognizably, this factor greatly enhances heat transfer.

Because the surface tension of aqueous solutions of alcohols with chain lengths of four carbon atoms and longer have a positive gradient with temperature when the temperature exceeds a certain value, the operating temperature of the evaporator can be increased. Consequently, the pumping pressure load and the heat load increase. In addition, the instability problems previously mentioned are overcome as well. The performances of heat pipes with water, including conventional heat pipes, CPLs and LHPs, and the micro heat pipes, are improved significantly by using the dilute aqueous solutions of these alcohols. The temperature at which the gradient becomes positive may be, for example, about 20° C. for aqueous solutions of n-decanol, about 40° C. for the aqueous solutions of n-heptanol, and about 70° C. for butanol solutions. Generally, the performance of all kinds of heat pipes can be greatly increased by changing the surface tension characteristics of their working fluids from the negative gradient to the positive gradient with temperature. Accordingly, the wick permeability in the operating temperature range of the heat pipes is perhaps doubled. This leads to a reduction of the liquid pressure loss in the heat pipes of about 50%. As a result, the heat load of the system is increased between about 30% and about 50%.

The location of the hydroxyl group in the carbon backbone of the alcohol does not appear to have any significant effect on the ability of the alcohol to improve the surface tension-temperature gradient of the working fluid. Thus, for example, in the n-hexanol family, 1-hexanol, 2-hexanol and 3-hexanol are all satisfactory. Furthermore, the degree or location of chain branching of the alcohol is not a factor. Thus, highly branched alcohols having between 4 and at least 10 carbon atoms can be used. Examples are sec-hexyl alcohol; 2,6 dimethyl-4-heptanol; 3,5-dimethyl-4-hetanol; 2,2 diethyl-1-pentanol; and 7-methyl-1-octanol. In addition, aliphatic alcohols having some degree of double or triple bond unsaturation can also be used, including unsaturated branched chain alcohols. An example is trans-2 hexen-1-ol. Also, the present invention contemplates the use of dilute aqueous solutions of cyclic and acyclic alcohols having one or more hydroxyl groups and possessing the characteristic of having a positive gradient of surface tension in the range of temperatures at which the heat pipe system operates.

There are unlimited commercial opportunities to use this invention. Among them are the following:

Spacecraft temperature equalization, component cooling and radiator design in satellites;

Commercial, residential and vehicular air conditioning systems;

Micro heat pipes for electronic devices, such as cooling in laptop computers;

Refrigeration and heat exchangers; and

Chemical and cryogenics applications.

Existing heat pipes, including the heat pipes used in industry, the micro heat pipes used in the electronic equipment, and the CPLs and LHPs in space flight missions, can be reformed by using this invention. Applying this invention can also develop the new products of heat pipes.

The specific details of the aqueous alcohol solutions and their method of preparation are well known to persons of ordinary skill in the art and do not comprise a part of the present invention, except to the extent that these details and uses have been modified to become useful therein. While the invention has been described in combination with embodiments thereof, it is evident that many alternatives, modifications, and variations will be apparent to those skilled in the art in light of the foregoing teachings. Accordingly, the invention is intended to embrace all such alternatives, modifications and variations as fall within the spirit and scope of the appended claims.

What is claimed is:

1. A heat pipe system comprising a closed evaporating-condensing cycle and including a working fluid having a positive gradient of surface tension with temperature at operating temperature range of the system.

2. The system according to claim 1 wherein working fluid comprises an aqueous solution of an alcohol containing at least four carbon atoms.

3. The system according to claim 2 wherein the alcohol is selected from the group consisting of $C_4$ to $C_{10}$ straight and branched chain aliphatic alcohols.

4. The system according to claim 1 wherein the heat pipe is selected from a conventional heat pipe, a capillary pumped loop, a loop heat pipe and a micro heat pipe.

5. The system according to claim 2 wherein the concentration of the alcohol in the aqueous solution is between about 0.0005 and about 0.005 moles per liter of water.

6. A working fluid for a heat pipe system wherein the fluid exhibits a positive gradient of surface tension at its operating temperature range of the system.

7. The working fluid according to claim 6 wherein the fluid comprises an aqueous solution of an alcohol containing more than four carbon atoms.

8. The working fluid according to claim 6 wherein the alcohol is selected from the group consisting of $C_4$ to $C_{10}$ straight and branched chain aliphatic alcohols and mixtures thereof.

9. The working fluid according to claim 7 wherein the concentration of the alcohol in the aqueous solution is between about 0.0005 and about 0.005 moles per liter of water.

10. A method of achieving heat exchange under conditions of microgravity comprising the use of a working fluid in a heat exchanger wherein the fluid comprises an aqueous solution and an effective amount of a long-chain alcohol to provide the fluid with a positive gradient of surface tension with temperatures above about 40° C. at atmospheric pressure.

11. The method according to claim 10 wherein the fluid comprises an aqueous mixture of an alcohol containing at least four carbon atoms.

12. The method according to claim 11 wherein the alcohol is selected from the group consisting of $C_4$ to $C_{10}$ straight and branched chain aliphatic alcohols and mixtures thereof.

13. The method according to claim 10 wherein the concentration of the alcohol is between about 0.0005 and about 0.005 moles per liter of water.

14. The method according to claim 10 wherein the heat pipe is selected from a conventional heat pipe, a capillary pumped loop, a loop heat pipe and a micro heat pipe.

15. A method of increasing the heat transfer rate of an aqueous working fluid in a heat pipe comprising adding an effective amount of an alcohol to the working fluid to provide a solution having a positive gradient of surface tension with temperature in the range of operating temperatures of the fluid in the heat pipe.

16. The method according to claim 15 wherein the alcohol is a $C_4$ to a $C_{10}$ straight or branched chain alcohol.

17. The method according to claim 16 wherein the alcohol is an aliphatic alcohol and is added in an amount of between about 0.0005 and about 0.005 moles per liter of water.

* * * * *